No. 782,480. PATENTED FEB. 14, 1905.
A. BENNDORF.
STRAIGHT KNITTING MACHINE.
APPLICATION FILED OCT. 24, 1902.

5 SHEETS—SHEET 1.

No. 782,480. PATENTED FEB. 14, 1905.
A. BENNDORF.
STRAIGHT KNITTING MACHINE.
APPLICATION FILED OCT. 24, 1902.

5 SHEETS—SHEET 2.

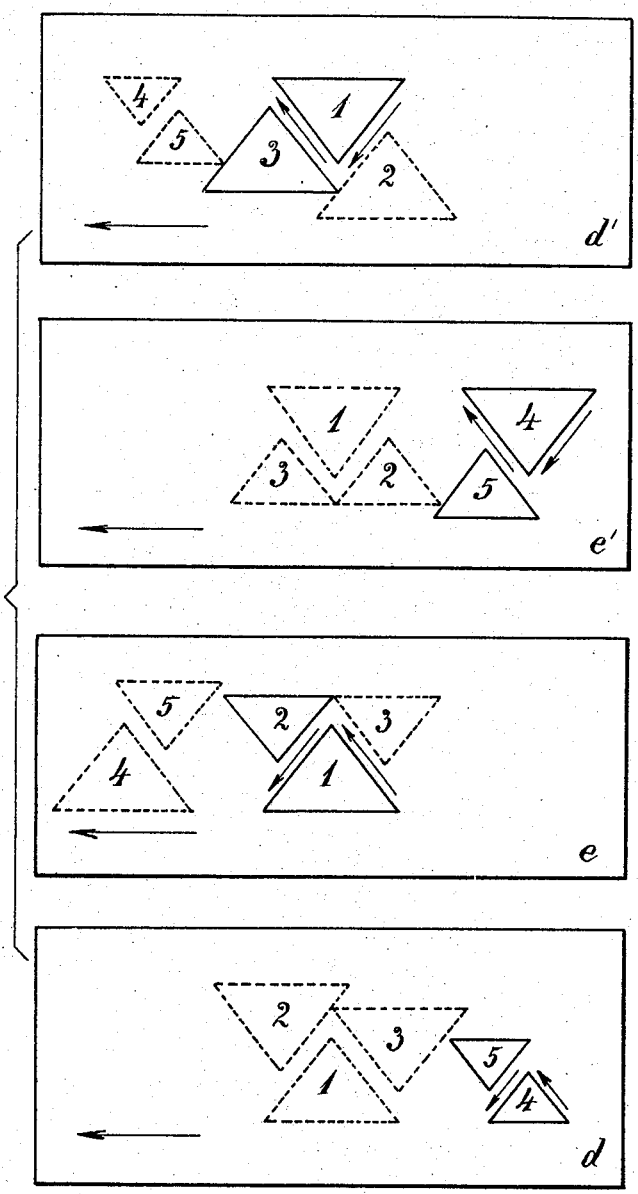

No. 782,480. PATENTED FEB. 14, 1905.
A. BENNDORF.
STRAIGHT KNITTING MACHINE.
APPLICATION FILED OCT. 24, 1902.

5 SHEETS—SHEET 5.

No. 782,480.

Patented February 14, 1905.

UNITED STATES PATENT OFFICE.

ALBIN BENNDORF, OF ZEULENRODA, GERMANY.

STRAIGHT-KNITTING MACHINE.

SPECIFICATION forming part of Letters Patent No. 782,480, dated February 14, 1905.

Application filed October 24, 1902. Serial No. 128,656.

*To all whom it may concern:*

Be it known that I, ALBIN BENNDORF, a subject of the German Emperor, residing at Zeulenroda, Reuss, Germany, have invented a new and useful Straight-Knitting Machine, of which the following is a specification.

This invention relates to certain new and useful improvements in straight-knitting machines of that class in which auxiliary needle-beds are employed.

The object of this invention is to provide a straight-knitting machine with two needle-beds for the production of tubular weft-mesh goods with widening and narrowing devices distinguished very materially from the machines of this kind heretofore existing by having the auxiliary needles arranged between the operating-needles directly in the beds of the latter, so that they coöperate with the operating-needles in the opposite needle-bed transversely and one after the other, and so transfer the sinker-meshes hanging upon them upon the operating-needles of the opposite bed. The widening and narrowing of the tubular goods is effected in a manner well known in the art.

The invention is clearly illustrated in the accompanying drawings, in which—

Figure 1:
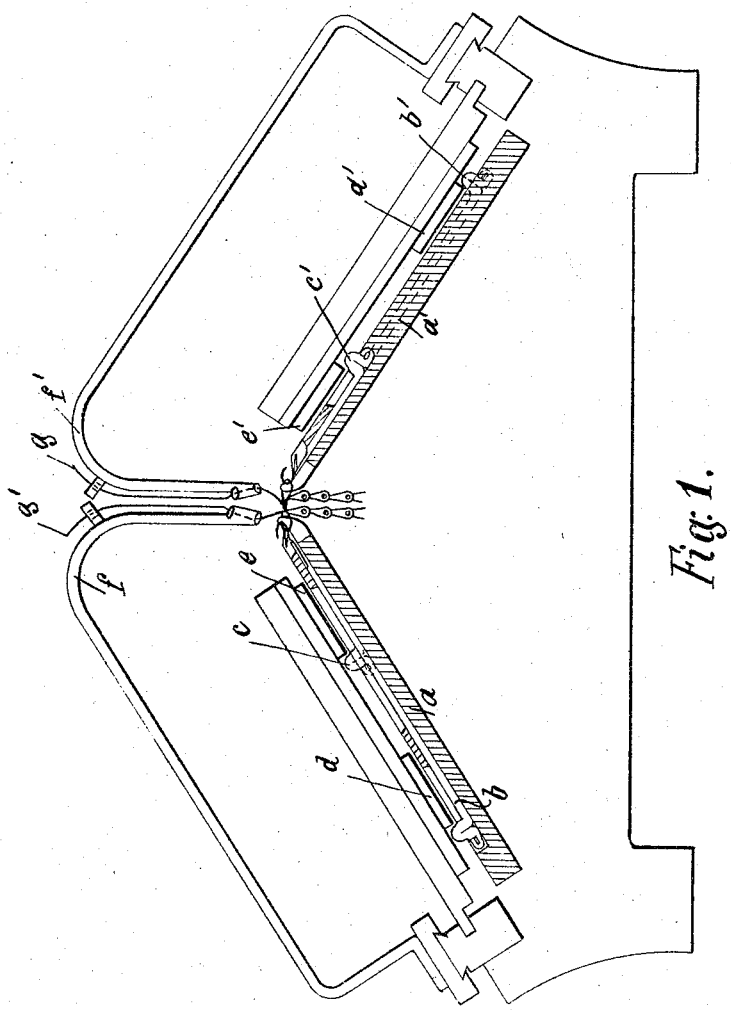
Figure 2:
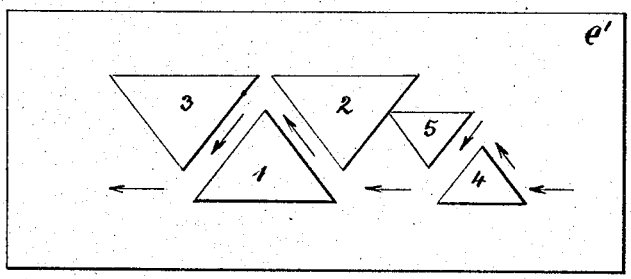
Figure 3:
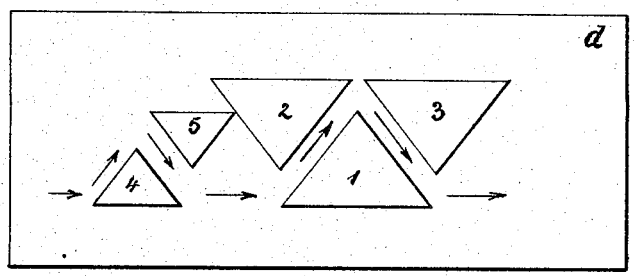
Figure 4:
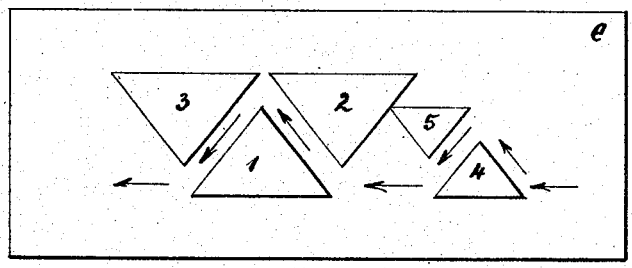
Figure 5:
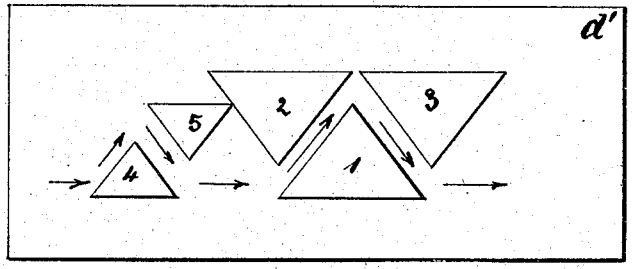
Figure 12:
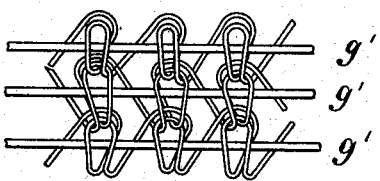
Figure 13:
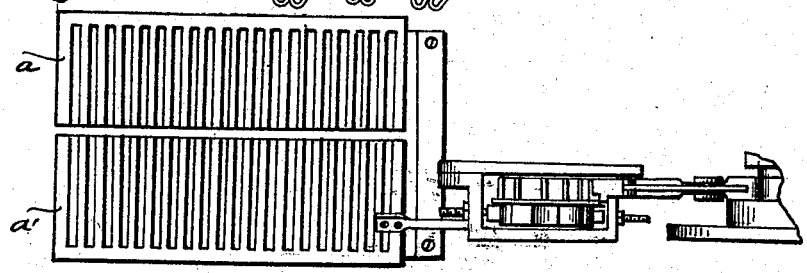

Figure 1 is a vertical cross-section through a machine constructed in accordance with my invention. Figs. 2 to 5 show the cams employed in their different positions. Figs. 6 to 11 are detail views showing the different positions the needles assume during the formation of the meshes, and Fig. 12 shows a portion of the finished goods. Fig. 13 is a diagrammatic view of the needle-beds, showing means for shogging the same endwise.

In the drawings, $a$ $a'$ represent the two needle-beds in which the operating-needles $b$ $b'$ and the auxiliary needles $c$ $c'$ are placed, while $d$ $d'$ and $e$ $e'$ are the respective cams, and $f$ $f'$ the thread-carriers. $g$ $g'$ are the ground or weft threads, $i$ $i'$ the ground or needle meshes, and $k$ the sinker-meshes.

Figure 6:
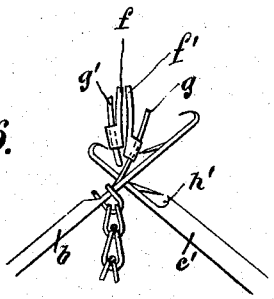
Figure 7:
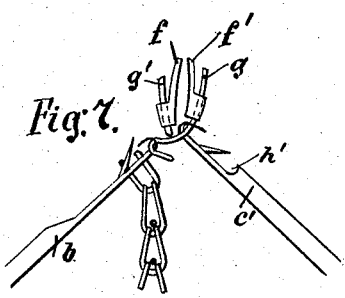
Figure 8:
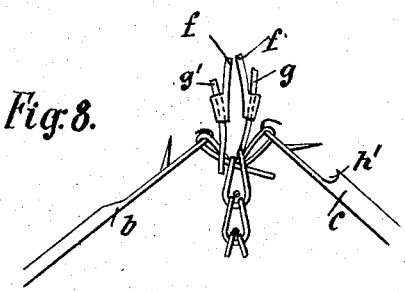
Figure 9:
Figure 10:
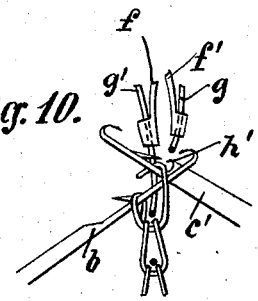
Figure 11:
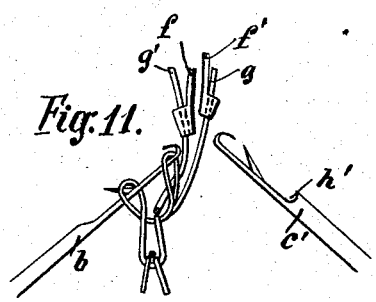
Figure 9A:
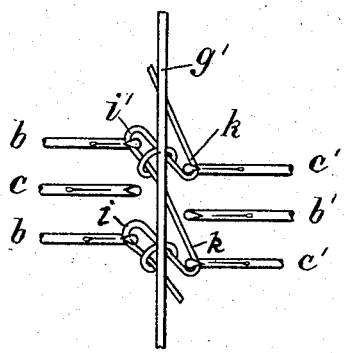
Figure 10A:
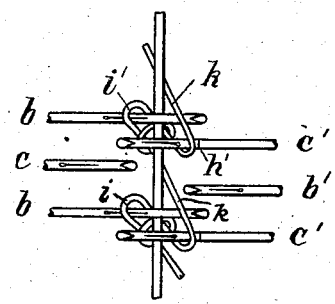

Looking at Fig. 6, (supposing the carriage is moving from the right to the left,) the operating-needle $b$ stands upon the highest portion of the needle-cam $l$ of the cam $d$. Upon its shaft the ground-mesh $i$ is hung up; but the auxiliary needle $c'$ is upon the needle-lifting cam $l$. The operating-needle $b$ is now grasped by the depressing-cam 3 of the cam $d$, so as to form the new ground-mesh $i''$. Meanwhile the auxiliary needle $c'$, upon which at this time no mesh is hanging, is drawn off simultaneously from the needle-sinker 2 of the cam $e'$, by which operation the sinker-mesh $k$ is formed. Fig. 7 represents the needles upon their way back during the operation of forming the meshes, and Figs. 8 and 9 represent the needles with the finished new-formed meshes. If the carriage stands now moved out to the left, the needle-bed in front will be displaced for half the length of a needle-bed and a layer of meshes, as shown in Fig. 9, will be formed. During the following movement from the left to the right the weft-thread carrier $f$ will advance and hang the weft-thread $g'$ over the meshes $i''$ and $k$, Fig. 9$^a$. The operating-needle $b$ is now grasped by the lifting-cam of the cam $d$; but the auxiliary needle $c'$ is grasped by the needle-cam 4 of the cam $e'$. As the shaft-surface of the auxiliary needle $c'$ is provided with a channel or groove $h$, the sinker-mesh is raised by means of said groove so high that the operating-needle $b$ can enter, Figs. 10 and 10$^a$, when the needles $b$ and $c'$ are upon the highest points of the needle-lifting cam 4 of the cams $d$ and $e'$, so that they will be drawn backward in the next moment by the depressing-cam 5 of the cams $d$ and $e'$. During this backward movement the tongue of the auxiliary needle $c'$ closes itself by the sinker-mesh $k$ sliding above it and the sinker-mesh is beaten off by the auxiliary needle and thrown onto the needle-lifting cam of the retreating operating-needle $b$. The operating-needle $b$ has during this movement only been raised to half the height, so that the ground-mesh $i$ was not beaten off. Consequently the operating-needle $b$ has now two kinds of meshes upon its hooks—namely, the ground-mesh $i''$ and the sinker-mesh $k$. Between both is the shoot-thread $g'$, tied up underneath the shaft of the needle $b$, Fig. 11. Furthermore, the parts 1 and 3 are acting during this movement, as well as the parts 1 and 2 of the cam $e$, to form again ground and sinker meshes upon the needles $b'$ and $c$. With these needles the same operation as described with reference to the needles $b$ and $c'$ is repeated. The movement of the needle-bed is effected alternately to the left or to the right. The Figs. 2, 3, 4, 5, and 2ª show the total *modus* of operation of the cam parts and needles, while the dotted lines represent the parts which are not working or which are disengaged. The parts 1 and 2 or 1 and 3 of all cams are always forming new ground and sinker meshes. Meanwhile the parts 4 and 5 bring always the sinker-meshes (fang-ears) of the auxiliary needles $c\ e'$ upon the operating-needles $b\ b'$ or perform the tying up of the shoot-thread.

The operation of the machine is the following: The rows of needles $b\ b'$ and the rows of auxiliary needles $c\ c'$ coöperate alternately, and the thread-carrier $f'$ preceding the cams of each row carries the thread for the forming of the ground goods to the needles in a manner already known, so that the thread can be grasped by the needles and the tubular web knit, Fig. 6. Suppose the parts 1 2 3 of the cam $d$ and the parts 1 2 3 of the cam $e'$ are in operating position, but the parts 4 5 of the cam $d$, the parts 4 5 of the cam $e'$, and the cams $e\,d'$ are disengaged. The operating-needles $b$ for the forming of needle-meshes and the auxiliary needles $c'$ for the formation of sinker-meshes $k$, Fig. 6, will then be caused to move. During the next movement of the carriage the parts 4 5 of the cam $d$ and the parts 4 5 of the cam $e'$ will coöperate. The thread $f$, which carries the weft-thread $g'$, is preceding the cams and lays the thread $g'$, Figs. 9 and 9ª, between the needle and sinker meshes. After this the sinker-mesh is raised by means of the channel or groove $h'$ upon the auxiliary needle $c'$, so that the operating-needle can enter between the sinker-mesh and the shaft of the needle, Figs. 10 and 10ª. The sinker-mesh $k$ is thus behind the tongue of the auxiliary needle $c'$, Figs. 10 and 10ª, and the needle is now so far removed from part 5 of cam $e'$ that the sinker-mesh is beaten off the needle and brought into the hooks of the operating-needles $b$. Two kinds of meshes are upon the operating-needle, and between them, is the weft-thread $g$, Fig. 1. Besides the parts 4 and 5 of the cams $d\ e$ the parts 1 2 3 of the cams $e\ d'$ are coöperating during the same movement of the carriage, so that needle and sinker meshes are formed again, between which in the next row the weft-thread $g'$ is laid, so that by and by the goods as shown in Fig. 12 are produced. Fig. 13 shows a convenient way of shogging one of the needle-beds.

What is claimed as new is—

1. In a straight-knitting machine, two needle-beds arranged at an angle to each other, operating-needles and auxiliary needles in each bed, with all the needles in one bed in the same plane, means to cause one of the needle-beds to make a forward movement, means to operate the needles the auxiliary needles being formed each with a substantially semicircular channel to allow the entering of an operating-needle into the sinker-mesh after the forward movement of a needle-bed, the auxiliary needles being arranged between the operating-needles and directly in the beds of the latter.

2. In a straight-knitting machine, two needle-beds arranged at an angle to each other, operating and auxiliary needles in each bed with all the auxiliary needles between the operating-needles and directly in the bed of the latter, with all the needles in one bed in the same plane and the auxiliary needles alternating with the operating-needles, and means to operate the needles.

3. In a straight-knitting machine, two needle-beds, arranged at an angle to each other, operating and auxiliary needles in each bed with all the needles in one bed in the same plane and the auxiliary needles arranged alternately with the operating-needles and directly in the beds of the latter, the auxiliary needles being formed with semicircular channels, and means for operating the needles.

4. In a straight-knitting machine, two needle-beds, operating and auxiliary needles in each bed with all the needles in one bed in the same plane, and the auxiliary needles arranged alternately with the operating-needles, the auxiliary needles being formed with semicircular channels, cams, and cams for acting upon the auxiliary needles to lift the meshes so that they may be shogged arranged to act in front of said first-mentioned cams, and means to shog one of the needle-beds.

In testimony whereof I affix my signature.

ALBIN BENNDORF.

In presence of—
J. STEPHAN,
ERNST SOHNABEL.